US006299926B1

(12) United States Patent
Balakrishnan et al.

(10) Patent No.: US 6,299,926 B1
(45) Date of Patent: Oct. 9, 2001

(54) BLACK TEA MANUFACTURE

(75) Inventors: Padma Balakrishnan; Anitha Rao; Navin K. Sharma, all of Bangalore (IN)

(73) Assignee: Unilever Patent Holdings B.V., Vlaardingen (NL)

( * ) Notice: Subject to any disclaimer, the term of this patent is extended or adjusted under 35 U.S.C. 154(b) by 0 days.

(21) Appl. No.: 09/563,194

(22) Filed: May 2, 2000

(30) Foreign Application Priority Data

May 6, 1999  (IN) .............................................. 339/BOM/99
Jun. 3, 1999  (EP) .................................................. 99304320

(51) Int. Cl.$^7$ ...................................................... A23F 3/00
(52) U.S. Cl. .............................. 426/597; 426/49; 426/465
(58) Field of Search .............................. 426/597, 49, 465

(56) References Cited

U.S. PATENT DOCUMENTS

| 3,709,694 | * | 1/1973 | Killinger et al. . | |
| 3,966,986 | | 6/1976 | Hunter et al. | 426/534 |
| 4,297,380 | | 10/1981 | Horman et al. | 426/597 |
| 4,880,649 | * | 11/1989 | Holzner et al. . | |
| 5,094,860 | * | 3/1992 | Newhall et al. . | |

FOREIGN PATENT DOCUMENTS

| 30 06 092 A1 | 10/1981 | (DE) . |
| 2 074 838 A | 11/1981 | (GB) . |
| 63 129952 | * 6/1988 | (JP) . |

OTHER PUBLICATIONS

Dhanaraj et al, Journal of the Science of Food and Agriculture, 37(2):185–193 (1986).
Krefting et al, Tea and Coffee Trade Journal, 148(5):25–26 (1976).
Bauer, "Common fragrance and flavor materials", 1985 (XP002123890).
Kobayashi et al, FSTA Abstract AN 89(07):H0069. Published 1989.

* cited by examiner

*Primary Examiner*—Anthony J. Weier
(74) *Attorney, Agent, or Firm*—Pillsbury Winthrop LLP

(57) ABSTRACT

A process for manufacturing black leaf tea with improved aroma. The process involves treating freshly plucked tea leaves with jasmonic acid or one of more derivatives thereof, macerating and fermenting the leaves, firing the fermented leaves to arrest fermentation and then drying them to yield black leaf tea. Treating the leaves in this way, preferably prior to a withering step, enhances aroma in the tea and infusions made from it.

11 Claims, No Drawings

BLACK TEA MANUFACTURE

The invention relates to a method for obtaining improved quality of black tea. The invention particularly relates to a process of treating tea leaves post plucking with senescence modulators like jasmonic acid and its derivatives to enhance the aroma of black tea.

BACKGROUND AND PRIOR ART

Black leaf tea is traditionally produced by oxidising and drying freshly plucked green tea leaves. The method of preparing such teas is well known to those skilled in the art. Generally, to prepare black leaf tea, fresh green leaves of the plant *Camellia sinensis* are withered (subjected to mild drying), comminuted or macerated, fermented (in which process enzymes in the tea leaf use atmospheric oxygen to oxidise various substrates to produce brown-coloured products) and then fired (to dry the tea leaves).

The withering process, which is sometimes omitted, allows certain chemical and biochemical changes to occur and also the moisture content of the leaves is brought down from 90% to 50–70%. Biochemical/chemical changes taking place during withering, increase the yield of the volatile flavour compounds in tea.

The disruption of the cellular integrity of leaf during the maceration step allows oxidation of catechins by enzymes such as polyphenol oxidase that results in the development of colour and aroma molecules.

Phenylacetaldehyde and benzaldehyde are the major aroma components and are formed during the fermentation stage. During the process of fermentation, the quinones formed from catechins by the action of enzyme polyphenol oxidases/peroxidases convert phenylalanine into phenyl acetaldehyde. Phenyl acetaldehyde imparts a floral aroma whereas benzaldehyde has a sweet almond like aroma. Apart from phenylacetaldehyde and benzaldehyde, the terpenoids are also important in imparting floral aroma to tea.

Jasmonic acid and its derivatives such as methyl jasmonate and dihydro jasmonate are known to induce senescence in plants and also mimic wound signal. However, it has now been found that treating tea leaves post plucking with these chemicals significantly enhances the aroma of tea.

STATEMENT OF THE INVENTION

The present can be said in broad terms to relate to process for manufacturing black leaf tea comprising the steps of treating freshly plucked tea leaves with jasmonic acid or one of more derivatives thereof, macerating and fermenting the leaves, firing the fermented leaves to arrest fermentation and then drying them to yield black leaf tea. Treating the leaves in this way enhances the aroma of the black tea and tea beverages made form the black tea.

Preferred derivatives of jasmonic acid include methyl jasmonate and methyl dihydro jasmonate.

The leaves are preferably with jasmonic acid or one of more derivatives thereof at a concentration of 0.0001 to 0.5% for 10 minutes to 24 hours at a temperature of 10 to 45° C. The substances can be applied singly (i.e. in one dose) or in split doses.

The invention can also be said to be a process of manufacturing black tea comprising treating tea leaves post plucking with jasmonic acid or its derivatives or a mixture thereof at a concentration of 0.001 to 0.5% for 14 to 20 hours at a temperature 15 to 30° C. to improve the aroma of tea.

"Tea" for the purposes of the present invention means leaf material from *Camellia sinensis* var. *sinensis* or *Camellia sinensis* var. *assamica*. It also includes rooibos tea obtained from *Aspalathus linearis* however that is a poor source of endogenous fermenting enzymes. "Tea" is also intended to include the product of blending two or more of any of these teas.

For the avoidance of doubt the word "comprising" is intended to mean including but not necessarily "consisting of" or "composed of". In other words the listed steps or options need not be exhaustive.

Except in the operating and comparative examples, or where otherwise explicitly indicated, all numbers in this description indicating amounts or concentrations of material ought to be understood as modified by the word "about".

DETAILED DESCRIPTION OF THE INVENTION

The present invention concerns a modification to the well known process for manufacturing black tea. The modification involves treating the tea leaves with jasmonic acid or its derivatives or a mixture thereof in order to enhance the aroma of the black tea and tea beverages made form the black tea.

The aroma enhancing compounds are applied post plucking, preferably prior to an optional but preferable withering step. The compounds are preferably in the form of a solution at a concentration of 0.0001–0.5%. The application of the aroma enhancing compounds is either singly or in split doses. The treatment is preferably given in the form of a spray or dip.

The aroma enhancing compounds are preferably jasmonic acid or one or more derivatives such as methyl jasmonate and dihydro jasmonate, or mixtures thereof.

The concentration of the compounds is in the range 0.0001 to 0.5% on made tea basis but preferably in the range of 0.001 to 0.2%.

The duration of the treatment is preferably 10 minutes to 24 hours but especially 14 to 20 hours.

The temperature during the treatment is preferably maintained at 10–45° C. but especially 15 to 30° C.

After treatment with the aroma enhancing compounds, the shoots are withered following the normal procedure.

After withering the tea is further processed according to conventional procedures, i.e. given four CTC cuts, fermented and fired.

The invention now will be illustrated with reference to non-limiting examples.

EXAMPLES

Example 1

Process of Withering

Freshly harvested green leaves (1 kg) were sprayed with 100 ml methyl jasmonate prepared by dissolving 0.2 g methyl jasmonate in a little alcohol and the volume made up to 100 ml with water to obtain a final concentration of 0.08% (on made tea basis) active ingredient (SAMPLE 1) or with 100 ml aqueous solution of ETHREL™ which contains 2-chloro ethyl phosphonic acid as the active ingredient obtained from Leo Chem, Bangalore, at a final concentration of 0.08% of the active ingredient (SAMPLE 2), at a temperature of about 25° C. for 18 hours. Leaves with and without the treatment using the aroma-enhancing compound were withered for 18 hours under ambient conditions.

Leaves without the methyl jasmonate treatment were used as control (SAMPLE 3).

Example 2
Improved Aroma Components of Black Tea

Black tea obtained from both control and treated (SAMPLES 1 and 3) were analysed for the aroma components by Head space gas chromatography (GC).

Tea aroma concentrates were prepared by extractive distillation of volatiles, using the Micro-Likens Nikkerson method. The aroma volatiles from black tea were extracted using a Micro Likens Nikkerson unit. The unit consists of a reflux unit and an extraction unit. 25 g of tea was placed in the round bottom flask of reflux unit and 400 ml of distilled hot water was added to it. In the extraction unit, 25 ml of dichloromethane was used to trap aroma volatiles. Both the flasks were heated to make it come to boil after which it was allowed to reflux for another 60 minutes. After the end of 60 minutes, the samples were allowed to cool, and the organic layer separated, dried over sodium sulphate and concentrated to 0.1 ml using nitrogen sparging. These concentrated samples were injected directly into a gas chromatograph (SHIMADZU GC 14A™). The injection volume was 1 ml. Peaks were identified by co-injection with authentic standards and peak areas of individual components were assessed.

The GC conditions were as follows:

| | |
|---|---|
| Column: | CARBOWAX ™ 20M bonded phase, 0.2 mm IDX 25m |
| Injector: | Split (ratio 4:1) |
| Temperature: | 200° C. |
| Detector: | Flame Ionisation Detector (FID) |
| Temperature: | 250° C. |
| Temperature programme: | 2 min isothermal at 50° C. |
| | 5° C. rise per minute to 180° C. |
| | 15 min isothermal at 180° C. |

The identities of the peaks were cross checked by co-injection with standard samples.

TABLE 1

Comparison of aroma of black tea

| Components | SAMPLE 3 (Control) | SAMPLE 1 (Methyl Jasmonate) |
|---|---|---|
| Linalool | 8061 | 10968 |
| Geraniol | 6888 | 7225 |
| Phenylacetaldehyde | 68693 | 84728 |
| 2-Phenylethanol | 1930 | 2891 |
| Benzyl alcohol | 4192 | 5491 |

The data presented in Table 1 shows that treatment with methyl jasmonate significantly increases the level of the compounds responsible for the aroma of black tea.

Example 3
Quality of Made Tea

Made tea was prepared as follows: After 18 hours of withering the leaves were processed using a mini-manufacturing facility at Daverashola (Tea Estate India Ltd., Daverashola, The Nilgiris, Tamil Nadu) factory. The mini-line consisted of CTC (cut-tear and -curl), fermenter (controlled temperature and humidity chamber) and fluid bed drier. The leaves were cut four times using the CTC machine and fermented for 60 minutes at 25° C. at 90% RH. The fermented dhool (macerated leaf) was fired for 20 minutes using a fluidised bed drier.

Example 4
Sensory Characters

Quantitative descriptive analysis (QDA) of made tea was conducted in accordance with the following methodology: The panel consisted of 12 housewives who have been trained for leaf and end cup evaluation. The panelists' scores for end cup attributes (including visual, in-mouth and aroma components) were measured on a ten point scale. The method of tea preparation used in the QDA study was based on "Tea preparation observation studies" carried out by Indian Market Research Bureau (IMRB).

The standardised method is as follows:
For 150 ml end cup of tea
1. Bring 82 ml of water to boil
2. Add 3 grams of tea and boil for 1 minute
3. Add 68 ml of pre-boiled milk and 6 grams (4%) sugar.
4. Boil till one rise
5. Serve at 70–75° C.

Using the black tea obtained from control and methyl jasmonate or ETHREL™ treated (applied during withering), QDA was carried out by a trained panel for evaluating the effects on various tea attributes and analysed statistically and the data of QDA is shown in Table 2 below.

TABLE 2

Comparative QDA analysis of samples

| QDA attributes | SAMPLE 3 (Control) | SAMPLE 2 (ETHREL ™) | SAMPLE 1 (Methyl jasmonate) |
|---|---|---|---|
| Bitter Taste | 2.54 | 1.54 | 2.27 |
| Bitter After Taste | 2.61 | 1.92 | 2.18 |
| Floral Aroma | nil | nil | 1.55 |
| Herbal Aroma | nil | nil | 0.64 |

QDA perceived only the methyl jasmonate treated teas have a significant floral and herbal aroma than the untreated tea that results in greater acceptability to the consumer. The panel did not perceive this aroma in the ETHREL™ treated teas. However, the bitter taste and bitter after taste was significantly reduced by both ETHREL™ and methyl jasmonate treatment.

Thus the present invention is directed to provide a method of obtaining tea leaves with higher aroma components and with improved quality of tea.

What is claimed is:

1. In a process for manufacturing black leaf tea comprising the steps of macerating freshly plucked tea leaves, allowing them to ferment, firing the leaves to arrest fermentation and then drying them to yield black leaf tea, the improvement which comprises treating the tea leaves with jasmonic acid or one or more derivatives thereof prior to maceration to enhance aroma.

2. A process according to claim 1 wherein the leaves are withered prior to being macerated.

3. A process according to claim 2 wherein the leaves are treated with the jasmonic acid or its derivatives prior to the withering step.

4. A process according to claim 1 wherein the jasmonic acid derivatives are selected from the group consisting of methyl jasmonate and methyl dihydro jasmonate.

5. A process according to claim 1 wherein the concentration of the jasmonic acid or its derivatives is 0.0001 to 0.5% on a made tea basis.

6. A process according to claim 5 wherein the concentration of the jasmonic acid or its derivatives is 0.001 to 0.2%.

7. A process according to claim 1 wherein the leaves are treated with the jasmonic acid or its derivatives for 10 minutes to 24 hours.

8. A process according to claim 7 wherein the leaves are treated with the jasmonic acid or its derivatives for 14 to 20 hours.

9. A process according to claim 1 wherein the jasmonic acid or its derivatives is applied to the leaves at a temperature of 10 to 45° C.

10. A process according to claim 9 wherein the jasmonic acid or its derivatives is applied to the leaves at a temperature of 15 to 30° C.

11. A process of manufacturing black tea comprising treating tea leaves post plucking with jasmonic acid or its derivatives or a mixture thereof at a concentration of 0.001 to 0.5% for 14 to 20 hours at a temperature 15 to 30° C. to improve the aroma of tea.

* * * * *